Figures 1, 2, 3, 4, 5:
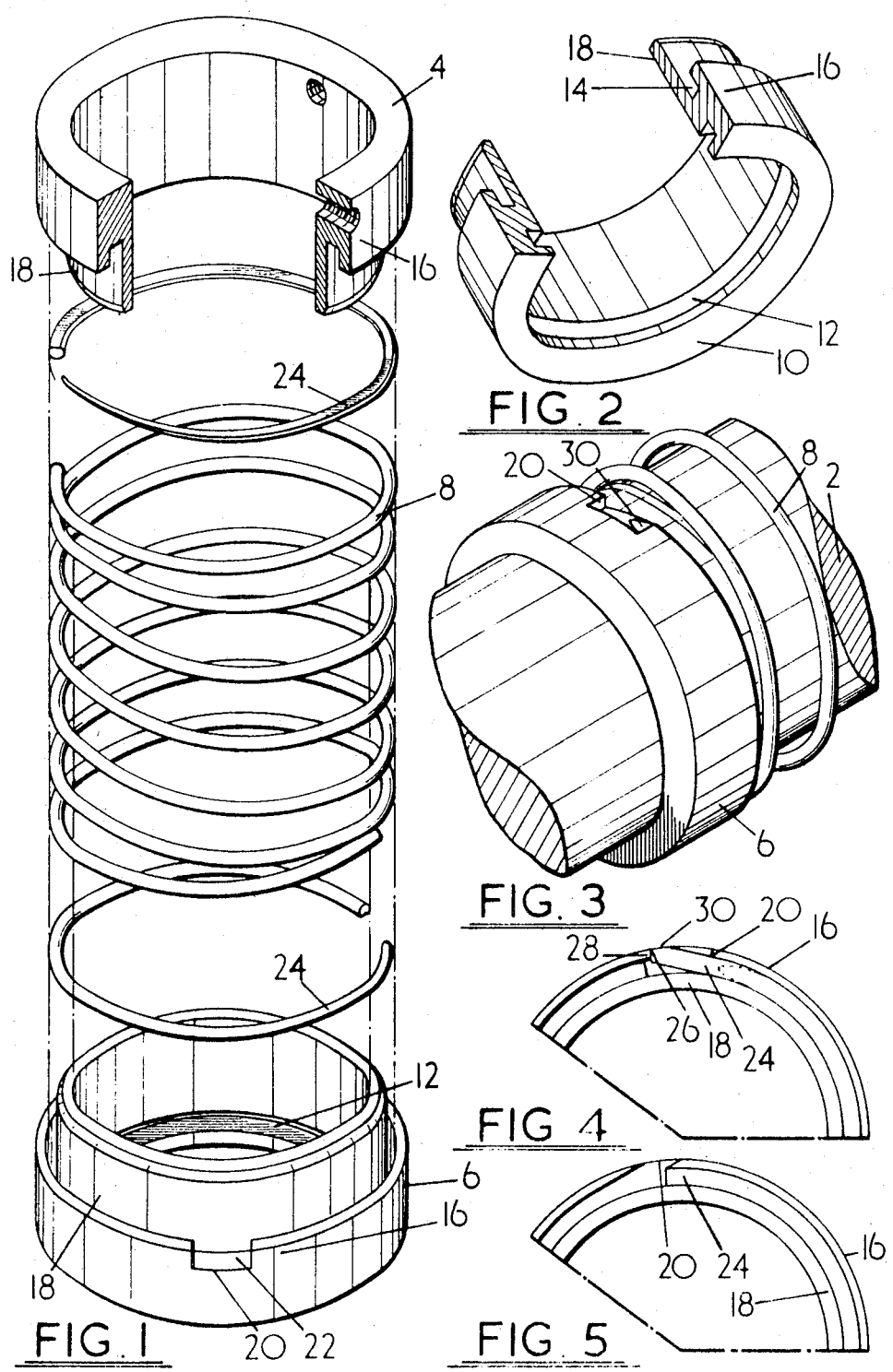

United States Patent

[11] 3,584,887

| [72] | Inventor | Ronald Brown<br>Whitefield, England |
|---|---|---|
| [21] | Appl. No. | 652,066 |
| [22] | Filed | July 10, 1967 |
| [45] | Patented | June 15, 1971 |
| [73] | Assignee | Burmah Oil Trading Limited<br>London, England |
| [32] | Priority | July 15, 1966 |
| [33] | | Great Britain |
| [31] | | 31882/66 |

[54] BIDIRECTIONAL ROTARY SEALS
4 Claims, 5 Drawing Figs.

| [52] | U.S. Cl. | 277/93 |
|---|---|---|
| [51] | Int. Cl. | F16j 15/34 |
| [50] | Field of Search | 277/93, 93<br>SD, 85—87, 91 |

[56] References Cited
UNITED STATES PATENTS

| 2,411,509 | 11/1946 | Endebak | 277/93 |
|---|---|---|---|
| Re. 23,189 | 1/1950 | Porges | 277/93 |
| 3,014,742 | 12/1961 | Mayer | 277/93 X |

FOREIGN PATENTS

| 16,079 | 3/1956 | Germany | 277/93 |
|---|---|---|---|
| 1,163,099 | 2/1964 | Germany | 277/93 SD |

Primary Examiner—Laverne D. Geiger
Assistant Examiner—Robert I. Smith
Attorney—Holman, Glascock, Downing and Seebold ABSTRACT: A mechanical seal for a shaft consisting of a loose seal ring and a fixed ring having grooves to seat a coaxial coil spring therebetween, with the ends of the spring being trapped in recesses in the rings whereby the fixed ring transmits rotation in either direction through the spring to the seal ring.

PATENTED JUN 15 1971

3,584,887

BIDIRECTIONAL ROTARY SEALS

This invention relates to mechanical seals and in particular to the type comprising a fixed seal ring and a rotatable seal ring cooperating therewith with the rotatable seal ring being rotatable with a shaft e.g. of a pump. The drive from the shaft to the rotatable seal ring is transmitted from a ring clamped to the shaft through a coil spring surrounding the shaft and adapted to urge the rotatable seal ring into engagement with the fixed seal ring as well as to provide a drive to the rotatable ring.

Such an arrangement is described in our British Pat. No. 622,141 but it has a disadvantage in that the drive to the rotatable seal ring is unidirectional in that a drive can only be applied in the direction in which the coil spring tends to tighten. If it is attempted to drive the rotatable ring in the opposite direction, the coil spring tends to unwind and slipping occurs.

An object of the present invention is to provide a mechanical seal having a seal ring to which a drive can be applied through a coil spring bidirectionally.

According to the present invention there is provided a mechanical seal for a shaft comprising a rotary seal ring for freely surrounding a rotary shaft and having a sealing face and inner and outer walls defining an axial annular groove opened remote from the sealing face, the outer wall being formed at the groove opening with a gap, a locking ring for surrounding the rotary shaft in rotatably fast relationship, the locking ring having inner and outer walls defining an axial annular groove opened towards the rotary seal ring, the outer wall being formed at the groove opening with a gap, a coil spring positioned between and interconnecting the rotary seal ring and the locking ring and frictionally gripping the inner walls of the rotary seal ring and locking ring, and a finger at each end of the coil spring tangential to the terminal coil of which it is a part and said finger projecting into the gap in the adjacent outer wall and abutting an axial surface of the wall defining the gap.

Two embodiments of the invention will now be described, the first with reference to the accompanying drawings in which:

FIG. 1 is an exploded perspective view of the seal;
FIG. 2 is a fragmentary perspective view of the seal ring;
FIG. 3 is a perspective view of the spring cooperating with the seal ring on the shaft;
FIG. 4 is a fragmentary side view of part of the seal ring showing the spring engaging seal ring; and,
FIG. 5 is the same view of another embodiment with the spring removed to show the shape of the recess.

Referring now to FIGS. 1, 2 and 3, the seal is arranged on a rotatable shaft 2 (FIG. 3) such as a pump shaft. The pump body is provided with a stationary seal ring (not shown), with the face of the seal ring acting as a surface against which the seal is urged.

The seal consists of three parts, a locked ring 4 which is clamped to the shaft 2 a short distance from the stationary seal ring, a rotary seal face member 6 which mates with the stationary seal ring and a compression spring 8 between the seal face member 6 and the locked ring 4.

The seal face member 6 is a steel seal ring with a front face 10 for contacting the stationary seal ring face and an internal groove 12 for housing an O-ring (not shown) which seals against the shaft 2. The rear face has a circular groove 14 of constant depth bounded on the outside by a raised skirt 16 and on the inside by an axial boss 18 of greater depth than the skirt. The skirt has a parallel sided recess 20 which extends to a floor or base 22 of the groove. There is in the groove a spacer 24 of tapering thickness in the form of substantially one complete coil of the spring and having a flat ground thereon perpendicular to the axis of the coil.

The ring 4 is of similar construction to the seal face member except there is not internal groove and the ring has grub screw holes for locking the ring on the shaft.

The compression spring 8 has open coils except at the ends where there are two coils lying side by side but these are covered by the skirts 16 on the seal ring 6 and locked ring 4. The internal diameter of the coils of the spring are an interference fit with the axial boss of the rings so as to fit under stress. Although both ends of the springs are identical one end only will be described together with the way in which it cooperates with the member and ring.

The end of the spring terminates in a straight finger 24 of a length which is about the same as the width of the recess 20. The finger is tangential to the coil of which it is part and projects into the recess. End face 26 of the spring abuts one side 28 of the recess and tip 30 of the spring which would normally stand proud of the curved surface of the ring is ground flush with the latter.

In order that the side 28 of the recess may contact the end face fully the latter is ground parallel to the former.

In another embodiment as illustrated in FIG. 5, the recess in the skirt wall is not parallel sided but U-shaped and the side walls of the recess are bevelled complementarily to conform in shape to the finger which is ground off at an oblique angle. There is no face to edge contact between the spring end and the side of the recess and torque is transmitted by the fingers tending to tilt in the recess and being urged against one or other of the recess walls thereby tightening the coils around the axial bosses and rotating them.

By means of the present invention a drive can be transmitted through the intermediary of the coil spring 8 from the locked ring 4 to the seal ring 6. In one direction of rotation of the rings, the effect is that described in our British Pat. No. 622,141 i.e. the end coils of the spring tend to tighten on the bosses 16 of the rings on which they are an interference fit. With the present arrangement however, a drive can be transmitted with rotation in the opposite direction since with such rotation the end of each coil spring abuts against the side wall of its associated recess thereby preventing relative rotation between the spring and either of the rings with which it is associated.

Although an arrangement has been described above in which a recess is provided in the seal and locked rings it will be apparent that any other suitable form of abutment means can be provided for example axial holes in the rings the ends of the spring being bent to lie axially of the spring and to enter the holes.

Also the invention can be employed not only for transmitting a drive to a rotary seal ring but also to prevent rotation of a seal ring.

What I claim is:

1. A mechanical seal comprising a rotary seal ring for freely surrounding a rotary shaft, said rotary seal ring having a sealing face and inner and outer walls defining an axial annular groove open remote from the sealing face, said outer wall being formed at the groove opening with a gap defined by axially extending walls, a locking ring for surrounding the rotary shaft in rotatably fast relationship, said locking ring having inner and outer walls defining an axial annular groove open towards said rotary seal ring, the outer wall of said locking ring being formed at the groove opening with a gap defined by axially extending walls, a coil spring positioned between and interconnecting said rotary seal ring and locking ring and frictionally gripping the inner walls of said rotary seal ring and locking ring, and the terminal portion of each end being disposed tangentially of the coil and projecting into the gap in the adjacent outer wall of the ring with which it is interconnected and abutting an axial surface of the wall defining the gap whereby the drive in one direction is permitted by the abutment of the terminal portion against the wall of the gap while the drive in the other direction is a tightening action of the coil spring on the inner walls of the seal face ring and the locking ring when rotation in said other direction is attempted.

2. The mechanical seal as claimed in claim 1, wherein each groove accommodates a spacer of tapering thickness to center the spring.

3. The mechanical seal as claimed in claim 1, wherein the end of the terminal portion which abuts the axial surface is ground flush with the outer wall whereby a more central and therefore larger area is available for abutting the axial surface.

4. The mechanical seal as claimed in claim 3, wherein the end of the terminal portion is ground parallel with the axial surface abutted by the end of the terminal portion.